March 23, 1954  H. M. HERMANSON  2,672,880
FLUID FLOW CONTROL APPARATUS
Filed Aug. 30, 1951
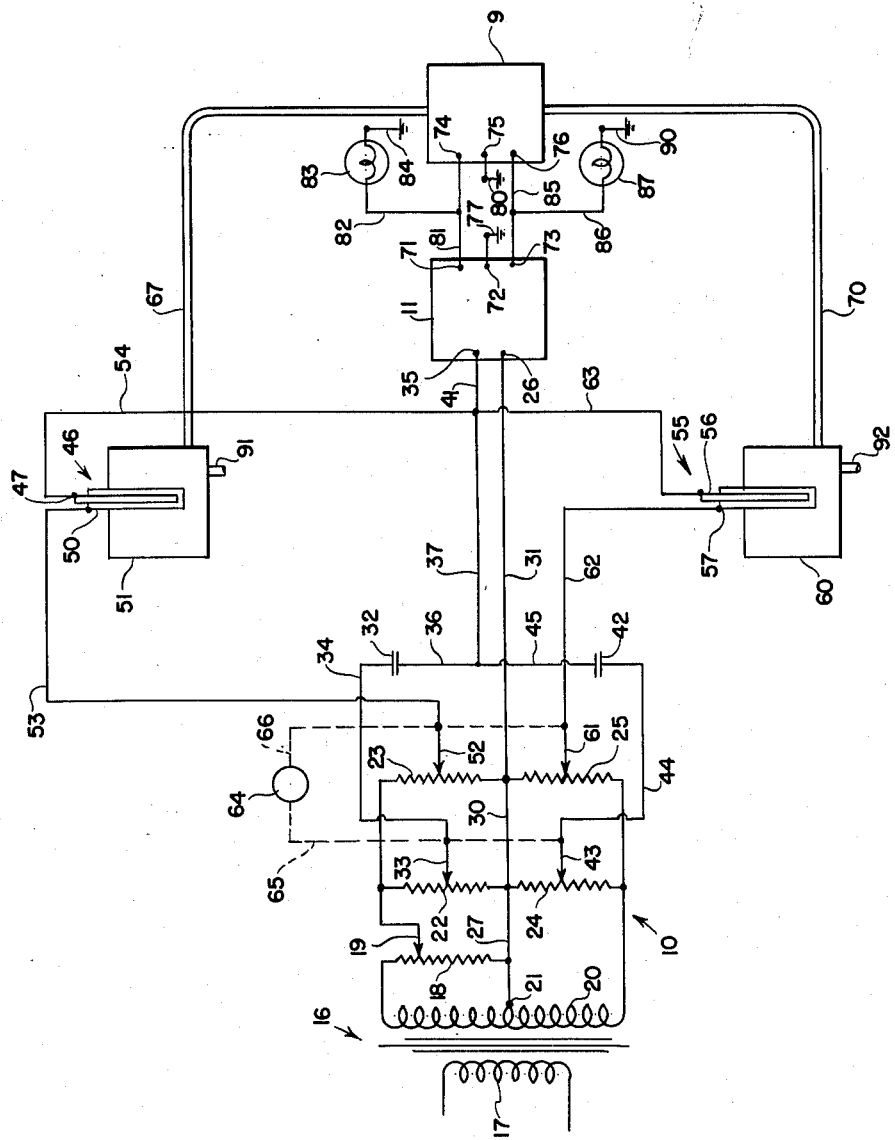
INVENTOR.
HARRY M. HERMANSON
BY
*George H Fisher*
ATTORNEY Patented Mar. 23, 1954

2,672,880

UNITED STATES PATENT OFFICE 2,672,880

FLUID FLOW CONTROL APPARATUS

Harry M. Hermanson, Minneapolis, Minn., assignor to Minneapolis-Honeywell Regulator Company, Minneapolis, Minn., a corporation of Delaware Application August 30, 1951, Serial No. 244,418

9 Claims. (Cl. 137—390)

This invention is concerned with control of flow of fluid from various containers and more particularly with controlling the quantities of fuel in various containers in an aircraft with respect to each other in order to control the center of gravity of the aircraft. It is therefore an object of this invention to devise a new and improved ratio control for controlling the flow of fuel between several tanks.

Another object of the invention is to devise a small, light-weight ratio control for controlling the flow of fuel between aircraft fuel tanks.

A further object of the invention is to devise a ratio control for controlling the flow of fuel between aircraft fuel tanks which may be manually adjusted.

A further object of the invention is to devise a ratio control for controlling the flow of fuel between aircraft fuel tanks in which the ratio may be manually varied during flight.

A further object of the invention is to devise a ratio control for controlling the flow of fuel between aircraft fuel tanks which uses a simple reversible pump.

Briefly, the invention consists of utilizing capacitive type tank units in which the capacitances of the tank units vary with change in fuel quantity in the tanks in which the tank units are placed due to the difference in dielectric constant between the fuel and the air in the tanks above the fuel.

The signals from a pair of tank units are compared to control the operation of a reversible pump in the transfer pipe between the tanks. It is often desired, in order to keep the center of gravity of a craft within specified limits, to have one tank drain more rapidly than a second tank. This may be, for example, when one tank is larger than the other tank. Therefore, a signal from a fixed capacitor is added to the signal from each tank unit with the voltages across each tank unit and capacitor being manually adjusted simultaneously. By this means it is possible to increase the effective signal from one of the tank units while decreasing the effective signal from the other tank unit and still keep the resultant signals equal. When the network is balanced, the pump is not energized. When the network is sufficiently unbalanced, the pump causes transfer of fuel from one tank to the other tank until the network is rebalanced.

For a more complete discussion of the invention reference is had to the following detailed description taken in conjunction with the accompanying drawing in which:

The single figure is a schematic diagram of the invention.

In the drawing, the network 10 controls the operation of an amplifier 11 to control the energization of motor and pump 9 in the transfer line between tanks 51 and 60. Pump 9 is a reversible pump, that is, it can pump in either direction, depending on the phase of the voltage energizing the motor.

Network 10 is energized by a transformer 16 having a primary 17 energized from a source of voltage, not shown. Transformer 16 has a secondary 20 having a tap 21. A balancing potentiometer 18 having a wiper arm 19 is connected between tap 21 and the upper terminal of secondary 20. Potentiometer 18 is preferably connected across more than half of secondary 20 for purposes subsequently to be described.

Potentiometers 22 and 23 are connected in parallel between the wiper arm 19 of potentiometer 18 and tap 21 of secondary 20 while potentiometers 24 and 25 are connected in parallel across the lower portion of transformer secondary 20. Tap 21 of transformer secondary 20 is connected to input terminal 26 of amplifier 11 through conductors 27, 30, and 31.

A fixed capacitor 32 is connected to wiper arm 33 of potentiometer 22 through conductor 34. Fixed capacitor 32 is also connected to the other input terminal 35 of amplifier 11 through conductors 36, 37, and 41. A fixed capacitor 42 is connected to wiper arm 43 of potentiometer 24 through conductor 44. Fixed capacitor 42 is also connected to the input terminal 35 of amplifier 11 through conductors 45, 37, and 41.

A tank unit 46, having an inner electrode 47 and an outer concentric electrode 50, is shown positioned in a tank 51. The outer electrode 50 of tank unit 46 is connected to wiper arm 52 of potentiometer 23 through conductor 53. The inner electrode 47 of tank unit 46 is connected to input terminal 35 of amplifier 11 through conductors 54 and 41.

A tank unit 55, having an inner electrode 56 and an outer concentric electrode 57, is shown positioned in a tank 60. Outer electrode 57 of tank unit 55 is connected to wiper arm 61 of potentiometer 25 through conductor 62. Inner electrode 56 of tank unit 55 is connected to input terminal 35 of amplifier 11 through conductors 63 and 41.

Tanks 51 and 60 send fuel to the engine, not shown, through pipes 91 and 92, respectively.

Wiper arm 19 is manually adjusted along potentiometer 18 in order to get equal voltages across potentiometers 22, 23, 24, and 25.

Wiper arms 33, 43, 52, and 61 of potentiometers 22, 24, 23, and 25 respectively are connected to a manually adjustable knob 64 through mechanical connections 65 and 66. The purpose of manual knob 64 is to control the comparative quantities of fuel in the tanks in order that the center of gravity of the fuel remains within a certain desired range and prevents the craft from becoming unbalanced upon consumption of fuel by the engine. Movement of knob 64 in a clockwise direction, as shown in the drawing, lowers wiper arms 52 and 61 of potentiometers 23 and 25, respectively, as it simultaneously raises the wiper arms 33 and 43 of potentiometers 22 and 24, respectively. Such a movement of knob 64 reduces the potential across tank unit 46 while raising the potential across fixed capacitor 32. Thus, if the capacitances of tank unit 46 and capacitor 32 are equal, the resultant signal from tank unit 46 and capacitor 32 remains the same since the signal supplied to amplifier 11 is in each case dependent upon the product of the voltage and the capacitance. The downward movement of wiper arm 61 of potentiometer 25 increases the signal from tank unit 55 while the movement of wiper arm upwardly along potentiometer 24 reduces the signal from capacitor 42. However, with tank unit 55 and capacitor 42 having equal capacitances the resultant signal from tank unit 55 and fixed capacitor 42 remains the same.

If the network is designed so that when tanks 51 and 60 are full the capacitances of capacitor 32 and tank unit 46 are equal and the capacitances of capacitor 42 and tank unit 55 are equal and the signal indications from capacitor 32 and tank unit 46 are equal and opposite in phase to the signal indications from capacitor 42 and tank unit 55, movement of manual knob 64 cannot throw the network out of balance until fuel is used. The signal indications may be equalized by adjusting wiper 19 on potentiometer 18. This makes it possible to set knob 64 in advance so that the desired ratio of fuel will be maintained between the tanks when the engine begins to draw fuel. When the engine begins to draw fuel, the capacitances of tank units 46 and 55 will change and cause unbalance of the network to the extent determined by the preset position of the manual knob.

Use of capacitors 32 and 42 permits balancing of the network prior to using fuel while at the same time presetting knob 64 to obtain the desired ratio of fuel to be maintained between the tanks when the fuel is being used. Also, if capacitors 32 and 42 were not used the unbalance of the network due to movement of knob 64 would be as great as the percentage of difference in voltage change across the two tank units. By the use of capacitors 32 and 42, however, the network unbalance is appreciably decreased. It is then possible, by manually moving wiper arm 19 along potentiometer 18, to rebalance the network and to indicate when balance is again attained in a manner subsequently to be described.

When movement of knob 64 causes unbalance, clockwise movement of knob 64 results in the signals from capacitor 42 and tank unit 55 being greater than the signals from capacitor 32 and tank unit 46. Therefore, with an equal drainage of fuel from tank 51 through pipe line 91 and from tank 60 through pipe line 92 the change in signal from tank unit 55 is proportionately greater than is the change in signal from tank unit 46. This results in unbalance of the network 10 to cause operation of amplifier 11 in a first direction.

Amplifier 11 is shown to have three output terminals 71, 72, and 73. Amplifier 11 may be any amplifier which is capable of being operated by a voltage signal of reversible polarity to reversibly operate a motor in its output circuit. Such an amplifier and motor combination is shown, for example, in the Upton Patent 2,423,534, assigned to the same assignee as the present invention. Output terminals 71 and 73 are connected to terminals 74 and 76 respectively of the motor and pump combination 9. Output terminal 72 of the amplifier is connected to ground terminal 77 while terminal 75 of the motor is connected to ground terminal 80.

Indicator light 83 is connected to amplifier output lead 81 by conductor 82 and also to ground terminal 84 so as to light up upon amplifier 11 being so energized as to energize conductor 81. In the same manner indicator light 87 is connected to amplifier output lead 85 by conductor 86 and also to ground terminal 90.

Pump 9 is connected to tank 51 by pipe line 91 and to tank 60 by pipe line 70 to control the transfer of fuel between the two tanks.

When network 10 is balanced amplifier 11 is unenergized and neither conductor 81 nor conductor 85 is energized. As a result, under balance conditions lights 83 and 87 are off. If network 10 is unbalanced, amplifier 11 is energized and energizes either conductor 81 or conductor 85, thus lighting up either light 83 or light 87. Now if manual knob 64 is moved, unbalancing network 10, it is possible to rebalance the network by moving wiper arm 19 along potentiometer 18 until both lights 83 and 87 are off.

With the unbalance of the network as previously described such that the signal from tank unit 55 decreases more rapidly than the signal from tank unit 46 upon equal drainage of the tanks through pipes 91 and 92 to cause an unbalance of the network and energize amplifier 11, pump 9 operates to transfer fuel from tank 51 to tank 60 until the network is again balanced. At this time the amplifier 11 is deenergized, deenergizing the motor and pump combination 9. The fuel then leaves both tanks in equal quantities until the change of signal of tank unit 55 with respect to change of signal of tank unit 46 again becomes sufficiently great to reenergize amplifier 11 and again energize the motor and pump combination to transfer additional fuel from tank 51 to tank 60.

If manual knob 64 is moved counterclockwise such that wiper arms 33 and 43 of potentiometers 22 and 24 are lowered while simultaneously raising the wiper arms 52 and 61 of potentiometers 23 and 25, the operation will be reversed. That is, the signal from tank unit 46 will be greater than the signal from tank unit 55 such that equal drainage of tanks 51 and 60 results in a greater signal drop from tank unit 46 than from tank unit 55. When this unbalance of network 10 becomes sufficiently great, amplifier 11 is energized to cause operation of the pump in the opposite direction and transfer fuel from tank 60 to tank 51. This fuel transfer continues until the signal unbalance of network 10 is sufficiently reduced to deenergize amplifier 11 and cause deenergization of the motor and pump 9.

If it is desired to control the comparative fuel quantities in more than a single pair of tanks, it is, of course, possible to place the tank units in these tanks in parallel with the tank units 46 and 55.

By the use of this circuit it is possible to set the controls on an aircraft and know that the response to the controls will remain approximately the same all through the flight because the center of gravity of the craft will remain relatively stationary. Also, adequate fuel flow to the engine is assured because the control of the comparative fuel quantities does not exist in the fuel lines to the engine but instead are placed in the transfer line between the tanks and so fuel flow to the engine from one tank is not cut off while the circuit is being rebalanced.

While only a particular design of the invention has been shown, it is realized that modifications may be made by those skilled in the art and it is therefore to be understood that the scope of this invention is limited only to the extent of the appended claims.

I claim as my invention:

1. Fluid flow control apparatus comprising in combination: first capacitive means in a first container of fluid, the capacitance of said capacitive means being an indication of the quantity of fluid in the container; second capacitive means in a second container of fluid, the capacitance of said second capacitive means being an indication of the quantity of fluid in the second container; a first capacitor; a second capacitor; first, second, third and fourth sources of variable potential; means connecting said first capacitive means to said first source of potential such as to derive a signal therefrom; means connecting said second capacitive means to said second source of potential such as to derive a signal therefrom; means connecting said first capacitor to said third source of potential such as to derive a signal therefrom; means connecting said second capacitor to said fourth source of potential such as to derive a signal therefrom; means connecting said first and second capacitive means and said first and second capacitors together such that the signals from one of said capacitive means and one of said capacitors oppose the signals from the other of said capacitive means and the other of said capacitors; and means operated by the resultant signal controlling the comparative quantities of fluid in the containers.

2. Fluid flow control apparatus comprising in combination: first capacitive means in a first container of fluid, the capacitance of said capacitive means being an indication of the quantity of fluid in the container; second capacitive means in a second container of fluid, the capacitance of said second capacitive means being an indication of the quantity of fluid in the second container; first and second sources of variable potential; means connecting said first capacitive means to said first source of potential such as to derive a signal therefrom; means connecting said second capacitive means to said second source of potential such as to derive a signal therefrom; means connecting said first and second capacitive means together such that the signal from said first capacitive means opposes the signal from said second capacitive means; means operated by the resultant signal controlling the comparative quantities of fluid in the containers; and means for simultaneously increasing the potential across one of said capacitive means and decreasing the potential across the other of said capacitive means.

3. Fluid flow control apparatus comprising in combination: first capacitive means in a first container of fluid, the capacitance of said capacitive means being an indication of the quantity of fluid in the container; second capacitive means in a second container of fluid, the capacitance of said second capacitive means being an indication of the quantity of fluid in the second container; a first capacitor; a second capacitor; first, second, third and fourth sources of variable potential; means connecting said first capacitive means to said first source of potential such as to derive a signal therefrom; means connecting said second capacitive means to said second source of potential such as to derive a signal therefrom; means connecting said first capacitor to said third source of potential such as to derive a signal therefrom; means connecting said second capacitor to said fourth source of potential such as to derive a signal therefrom; means connecting said first and second capacitive means and said first and second capacitors together such that the signals from one of said capacitive means and one of said capacitors oppose the signals from the other of said capacitive means and the other of said capacitors; means operated by the resultant signal controlling the comparative quantities of fluid in the containers; and means for simultaneously increasing the potential across one of said capacitive means and decreasing the potential across the other of said capacitive means.

4. Fluid flow control apparatus comprising in combination: first capacitive means in a first container of fluid, the capacitance of said capacitive means being an indication of the quantity of fluid in the container; second capacitive means in a second container of fluid, the capacitance of said second capacitive means being an indication of the quantity of fluid in the second container; a first capacitor; a second capacitor; first, second, third and fourth sources of variable potential; means connecting said first capacitive means to said first source of potential such as to derive a signal therefrom; means connecting said second capacitive means to said second source of potential such as to derive a signal therefrom; means connecting said first capacitor to said third source of potential such as to derive a signal therefrom; means connecting said second capacitor to said fourth source of potential such as to derive a signal therefrom; means connecting said first and second capacitive means and said first and second capacitors together such that the signals from one of said capacitive means and one of said capacitors oppose the signals from the other of said capacitive means and the other of said capacitors; means operated by the resultant signal controlling the comparative quantities of fluid in the containers; and means for simultaneously increasing the potentials across one of said capacitive means and one of said capacitors and decreasing the potentials across the other of said capacitive means and the other of said capacitors.

5. Fluid flow control apparatus comprising in combination: first responsive means in a first container of fluid, the impedance of said responsive means being an indication of the quantity of fluid in the container; second responsive means in a second container of fluid, the impedance of said second responsive means being an indication of the quantity of fluid in the second container; a first impedance; a second impedance; first, second, third and fourth sources of variable potential; means connecting said first responsive means to said first source of potential such as to derive a signal therefrom; means connecting said second responsive means to said second source of potential such as to derive a signal therefrom; means connecting said first impedance to said third source of potential such as to derive a signal therefrom; means connecting said second impedance to said fourth source of potential such as to derive a signal therefrom; means connecting said first and second responsive means and said first and second impedances such that the signals from one of said responsive means and one of said impedances oppose the signals from the other of said responsive means and the other of said impedances and derive a resultant signal; and means operated by the resultant signal controlling the comparative quantities of fluid in the containers.

6. Fluid flow control apparatus comprising in combination: first responsive means in a first container of fluid, the impedance of said responsive means being an indication of the quantity of fluid in the container; second responsive means in a second container of fluid, the impedance of said second responsive means being an indication of the quantity of fluid in the second container; first and second sources of variable potential; means connecting said first responsive means to said first source of potential such as to derive a signal therefrom; means connecting said second responsive means to said second source of potential such as to derive a signal therefrom; means connecting said first and second responsive means such that the signal from said first responsive means opposes the signal from said second responsive means and derive a resultant signal; means operated by the resultant signal controlling the comparative quantities of fluid in the containers; and means for simultaneously increasing the potential across one of said responsive means and decreasing the potential across the other of said responsive means.

7. Fluid flow control apparatus comprising in combination: first responsive means in a first container of fluid, the impedance of said responsive means being an indication of the quantity of fluid in the container; second responsive means in a second container of fluid, the impedance of said second responsive means being an indication of the quantity of fluid in the second container; a first impedance; a second impedance; first, second, third and fourth sources of variable potential; means connecting said first responsive means to said first source of potential such as to derive a signal therefrom; means connecting said second responsive means to said second source of potential such as to derive a signal therefrom; means connecting said first impedance to said third source of potential such as to derive a signal therefrom; means connecting said second impedance to said fourth source of potential such as to derive a signal therefrom; means connecting said first and second responsive means and said first and second impedances such that the signals from one of said responsive means and one of said impedances oppose the signals from the other of said responsive means and the other of said impedances and derive a resultant signal; means operated by the resultant signal controlling the comparative quantities of fluid in the containers; and means for simultaneously increasing the potentials across one of said responsive means and one of said impedances and decreasing the potentials across the other of said responsive means and the other of said impedances.

8. Apparatus for controlling the distribution of liquid between two tanks, comprising: a capacitor in each tank the capacity of which varies proportionally to the volume of liquid in the tank; a source of cyclically varying voltages connected to said capacitors for obtaining signals from said capacitors; electrical means responsive to the relative magnitudes of the signals from said capacitors; flow control means controlled by said electrical means for varying the relative volumes of the liquid in the tanks for maintaining the relative volumes of liquid in the tanks at a predetermined desired value; and means for changing the desired value by varying the magnitudes of the signals from the capacitors independently of changes in the capacities of the capacitors by varying the voltages across said capacitors.

9. Apparatus for controlling the distribution of liquid between two tanks, comprising: a responsive means in each tank the impedance of which varies proportionally to the volume of liquid in the tanks; a source of voltages connected to said responsive means for obtaining signals from said responsive means; electrical means responsive to the relative magnitudes of the signals from said responsive means; flow control means controlled by said electrical means for varying the relative volumes of the liquid in the tanks for maintaining the relative volumes of liquid in the tanks at a predetermined desired value; and means for changing the desired value by varying the magnitudes of the signals from the responsive means independently of changes in the impedances of the responsive means by varying the voltages across said responsive means.

HARRY M. HERMANSON.

References Cited in the file of this patent
UNITED STATES PATENTS

| Number | Name | Date |
|---|---|---|
| 2,557,438 | Johnson | June 19, 1951 |
| 2,563,280 | Schafer et al. | Aug. 7, 1951 |